United States Patent
Fadler et al.

(10) Patent No.: US 8,585,378 B2
(45) Date of Patent: Nov. 19, 2013

(54) INTEGRATED ENDSHIELD AND PUMP VOLUTE FOR AN ELECTRIC PUMP AND METHOD OF FORMING AN ELECTRIC PUMP

(75) Inventors: Richard J. Fadler, St. Charles, MO (US); Robert J. Schmidt, St. Peters, MO (US); Philip S. Johnson, Granite City, IL (US); Brian P. Klein, St. Louis, MO (US); George A. Clark, Lewis Center, OH (US)

(73) Assignee: Nidec Motor Corporation, St. Louis, MO (US)

( * ) Notice: Subject to any disclaimer, the term of this patent is extended or adjusted under 35 U.S.C. 154(b) by 348 days.

(21) Appl. No.: 12/492,022

(22) Filed: Jun. 25, 2009

(65) Prior Publication Data

US 2010/0329904 A1     Dec. 30, 2010

(51) Int. Cl.
*F04B 35/04*     (2006.01)

(52) U.S. Cl.
USPC ............ 417/423.11; 417/423.14; 417/423.12; 417/423.1

(58) Field of Classification Search
USPC ................. 417/410.1, 423.11, 423.1, 423.12, 417/423.14; 415/206
See application file for complete search history.

(56) References Cited

U.S. PATENT DOCUMENTS

| | | | |
|---|---|---|---|
| 1,446,800 A * | 2/1923 | Hurd | 417/201 |
| 3,316,847 A * | 5/1967 | Mandy et al. | 417/423.11 |
| 3,364,860 A * | 1/1968 | Schmitt-Matzen | 415/61 |
| 3,576,380 A * | 4/1971 | Sargeant | 417/423.11 |
| 3,664,760 A * | 5/1972 | Reiner | 415/174.2 |
| 3,871,796 A * | 3/1975 | Mack | 417/423.11 |
| 3,967,915 A * | 7/1976 | Litzenberg | 415/211.1 |
| 4,535,262 A | 8/1985 | Newberg | |
| 4,689,511 A | 8/1987 | Baker et al. | |
| 4,904,166 A | 2/1990 | Wasemann | |
| 4,992,690 A * | 2/1991 | Baker | 310/89 |
| 5,034,644 A * | 7/1991 | Kech | 310/405 |
| 5,232,350 A | 8/1993 | Richardson | |
| 5,263,825 A | 11/1993 | Doolin | |
| 5,326,235 A | 7/1994 | Bruhn | |
| 5,475,275 A * | 12/1995 | Dohogne et al. | 310/89 |
| 5,618,168 A * | 4/1997 | Moon | 417/423.11 |
| 5,894,180 A * | 4/1999 | Volz et al. | 310/89 |

(Continued)

FOREIGN PATENT DOCUMENTS

CN     1826470 A     8/2006
JP     2003074464 A     3/2003

OTHER PUBLICATIONS

Karassik et al., "Pump Handbook", 2001, McGraw-Hill Professional, 3rd Edition, 2001; Online Jun. 4, 2008, http://books.google.com/books?id=yU5TyJrOMF8C.

*Primary Examiner* — Charles Freay
*Assistant Examiner* — Alexander Comley
(74) *Attorney, Agent, or Firm* — Thompson Coburn LLP

(57) ABSTRACT

An electric pump has a stator, a rotor, a pump volute, and an endshield. The pump volute and the endshield are formed together as a single monolithic part, thereby minimizing the axial length of the electric pump. A drainage passageway is provided on the endshield to harmlessly drain away any fluid that seeps past the pump's seals. In one embodiment of the invention, the drainage passageway is a groove that faces the stator and is configured to facilitate the evaporation of and leak fluid by channeling the fluid near the stator, which warms the fluid and thereby increases the fluid's evaporation rate.

7 Claims, 8 Drawing Sheets

(56) References Cited

U.S. PATENT DOCUMENTS

| | | | |
|---|---|---|---|
| 6,155,804 A * | 12/2000 | Hunsberger et al. | 417/410.1 |
| 6,707,202 B2 * | 3/2004 | Fadler et al. | 310/91 |
| 7,819,640 B2 | 10/2010 | Kalavsky et al. | |
| 2002/0157391 A1 | 10/2002 | Ohashi et al. | |
| 2003/0184169 A1 | 10/2003 | Fadler et al. | |
| 2004/0105767 A1 * | 6/2004 | Black et al. | 417/420 |
| 2004/0241009 A1 | 12/2004 | Dinkel et al. | |
| 2005/0158195 A1 * | 7/2005 | Peterson et al. | 417/423.11 |
| 2006/0099090 A1 | 5/2006 | Kramp et al. | |
| 2007/0286723 A1 * | 12/2007 | Ihle et al. | 415/206 |

\* cited by examiner

INTEGRATED ENDSHIELD AND PUMP VOLUTE FOR AN ELECTRIC PUMP AND METHOD OF FORMING AN ELECTRIC PUMP

CROSS-REFERENCE TO RELATED APPLICATIONS

Not Applicable

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention pertains generally to electric pumps. More specifically, this invention pertains to an electric pump that comprises a novel endshield.

2. General Background

Electric fluid pumps, such as those used in appliances, often comprise a centrifugal fluid pump attached to one end of an electric motor. Typically, the centrifugal pump comprises an impeller that rotates in a volute. The impeller is rotationally driven by the rotor of an electric motor and the volute is typically fastened to the adjacent endshield of the electric motor. One or more seals typically inhibit water or other fluids from traveling along or around the rotor shaft to the core of the electric motor's stator. However, over time and as the pump wears, it is not uncommon for at least some fluid to migrate past the seal or seals. Fluid seepage that migrates into an adjacent electric motor can negatively impact the efficient operation of the motor or shorten its useful life. For these reasons, the electric motor and pump are typically oriented relative to each other in a manner such that the electric motor is not directly beneath the pump. Thus it is often desirable to position the electric motor and the pump side-by-side. While positioning the electric motor to the side, rather than beneath the pump, inhibits seepage into the motor, liquid seepage from the pump bearings still may nonetheless travel along or around the rotor shaft toward the stator.

In view of these concerns, it is known to provide an electric pump with a liquid drainage cavity that is specifically configured to prevent liquid that has seeped past the rotor shaft bearing of the pump from being drawn by capillary action into the stator of the electric motor. The cavity is typically formed in the interface plate of the electric motor and encircles the rotor shaft in a manner providing an annular void around a portion of the shaft. The cavity thereby provides a place for seeped liquid to migrate and prevents capillary action from drawing the liquid into the stator, which would likely occur if there was little space around the shaft. Assuming the liquid seepage is slight, the cavity can serve as a reservoir for such liquid and thereby prevent the liquid from migrating into the stator. However, if the seepage is too great, the fluid will fill the cavity and then migrate into the stator. For this reason, some electric pumps comprise a drainage passageway configured to drain the cavity.

In addition to the concerns discussed above, there is also an endless desire to minimize the size of electric pumps without compromising their performance. The incorporation of a cavity for draining fluid seepage typically increases the overall length of an electric pump and therefore can be undesirable.

SUMMARY OF THE INVENTION

The present invention provides for a shorter electric fluid pump and facilitates the evaporation of fluid leakage that manages to seep past the seals of the pump volute.

In one aspect of the invention, an improved electric pump comprises a stator, a rotor, an endshield, and a bearing. The rotor has a rotor shaft. The endshield is fixed to the stator and comprises a shaft opening. The shaft opening extends through the endshield. The rotor shaft extends through the shaft opening. The bearing is supported by the endshield and at least partially supports the rotor shaft in a manner allowing the rotor shaft to revolve relative to the endshield. The improvement comprises a fluid pump volute formed as an integral portion of endshield. Incorporating the fluid pump volute in the endshield reduces the length of the electric fluid pump since a separate fluid pump volute is no longer required.

In another aspect of the invention, an electric pump comprises a stator, a rotor, an endshield, and a bearing. The rotor has a rotor shaft. The endshield is fixed to the stator and comprises a shaft opening and a fluid pump volute. The shaft opening extends through the endshield. The rotor shaft extends through the shaft opening. The bearing is supported by the endshield and at least partially supports the rotor shaft in a manner allowing the rotor shaft to revolve relative to the endshield.

In yet another aspect of the invention, an electric pump comprises a stator, a rotor, an endshield, and a bearing. The rotor has a rotor shaft. The endshield is fixed to the stator and comprises a shaft opening and a drainage groove. The shaft opening extends through the endshield. The rotor shaft extends through the shaft opening. The drainage groove extends downward from the shaft opening and is configured and adapted to channel liquid downward from the shaft opening via gravity. The drainage groove faces the stator. The bearing is supported by the endshield and at least partially supports the rotor shaft in a manner allowing the rotor shaft to revolve relative to the endshield. This facilitates the evaporation of any fluid seepage.

In still another aspect of the invention, a method of forming an electric motor comprises molding an endshield as a single monolithic part in a manner such that the endshield comprises a fluid pump volute and a shaft opening. The shaft opening extends through the endshield. The method further comprises attaching the endshield to a stator in a manner such that the fluid pump volute faces away from the stator. Still further, the method comprises positioning a bearing in the shaft opening of the endshield and positioning a rotor shaft in manner such that the rotor shaft extends through the bearing and through the shaft opening of the endshield. Using this method, the length of electric fluid pumps can be minimized.

For purposes of describing the invention, the electric pumps are described herein as being in particular orientations. Nonetheless, it should be appreciated that when the electric pump is utilized, the orientation of the electric pump may be other than described herein. Thus, the orientations described herein a merely for the purpose of describing relative orientation of various features of the invention, unless such orientations are specifically claimed.

Further features and advantages of the present invention, as well as the operation of the invention, are described in detail below with reference to the accompanying drawings.

Figure 1:
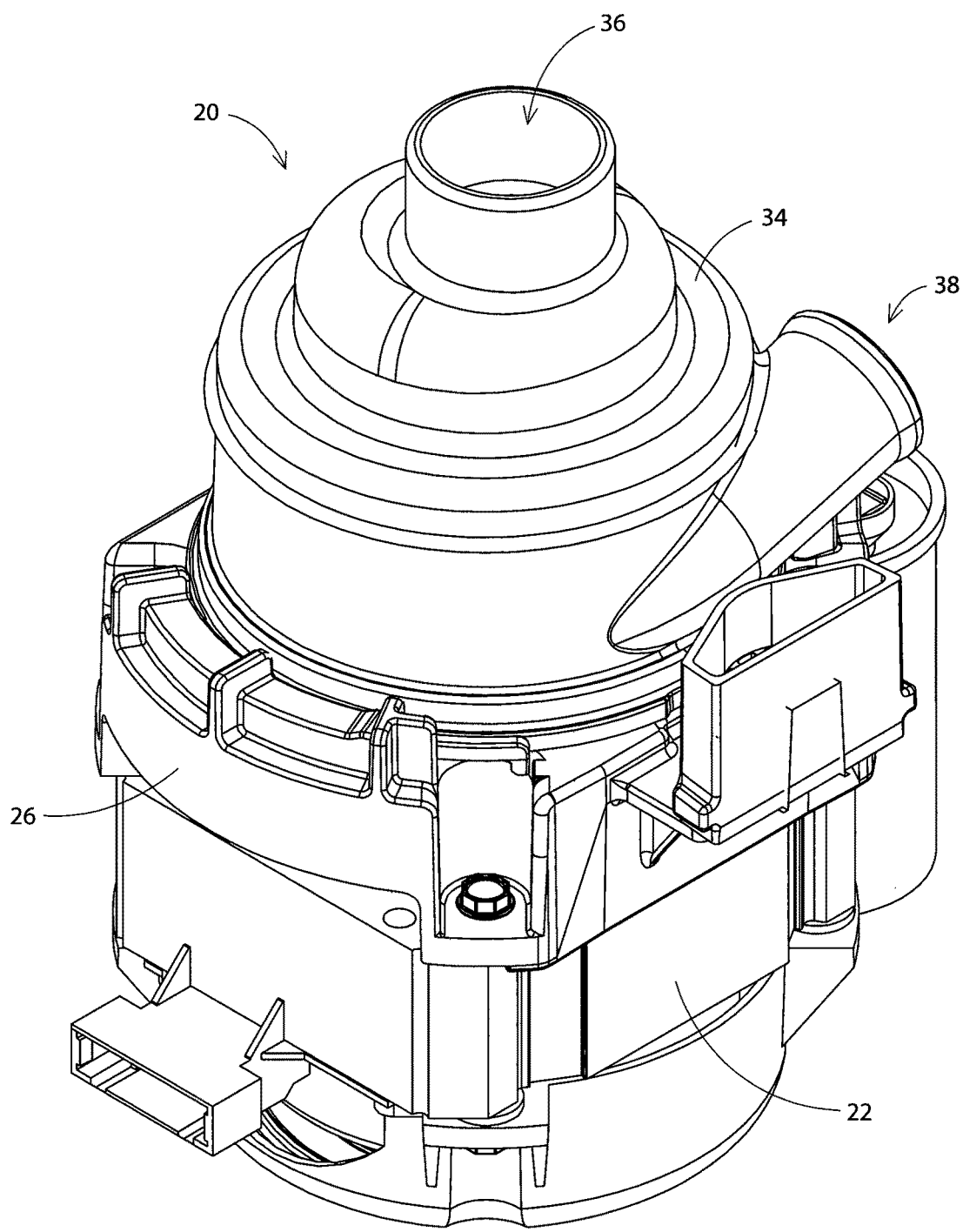
FIG. 1 is a perspective view of one embodiment of an electric motor in accordance with the invention, showing the front, top, and right side of the electric motor.
Figure 2:
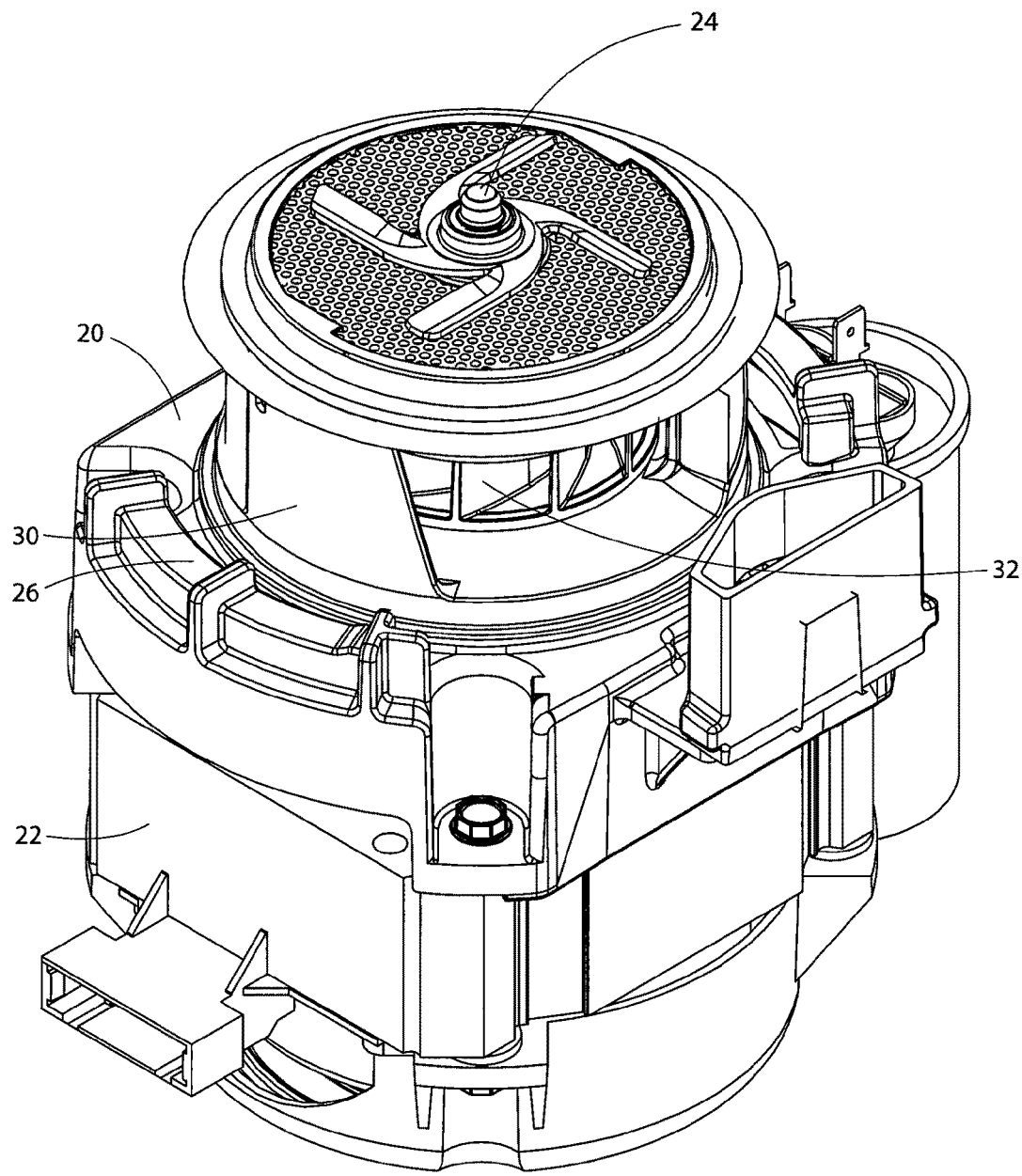
FIG. 2 is a perspective view of the electric motor as shown in FIG. 1 but is shown with the volute housing removed to reveal the impeller within the volute of the endshield.
Figure 3:
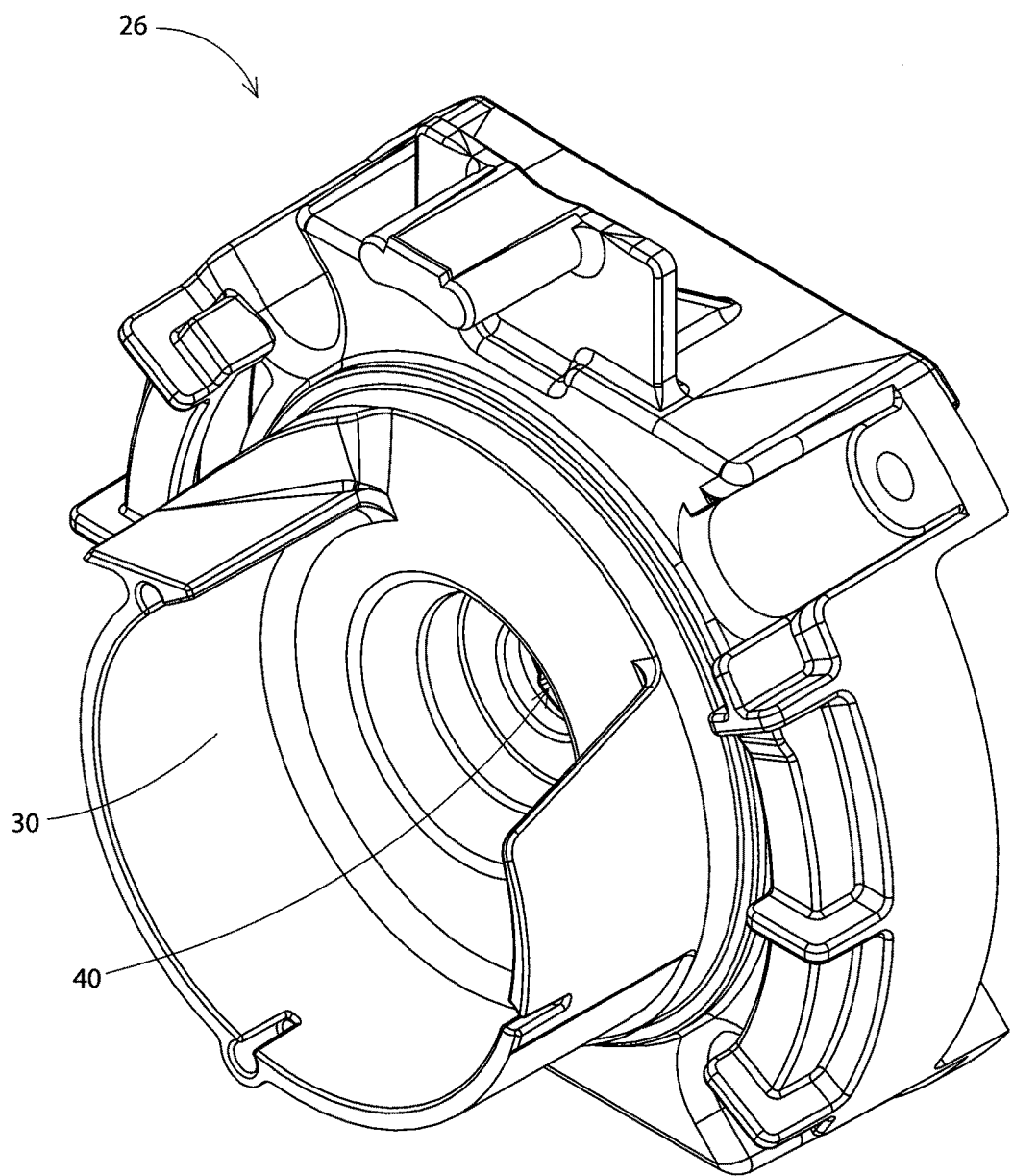
FIG. 3 is a perspective view of the endshield of the electric motor, showing the front, top, and right side of thereof.
Figure 4:
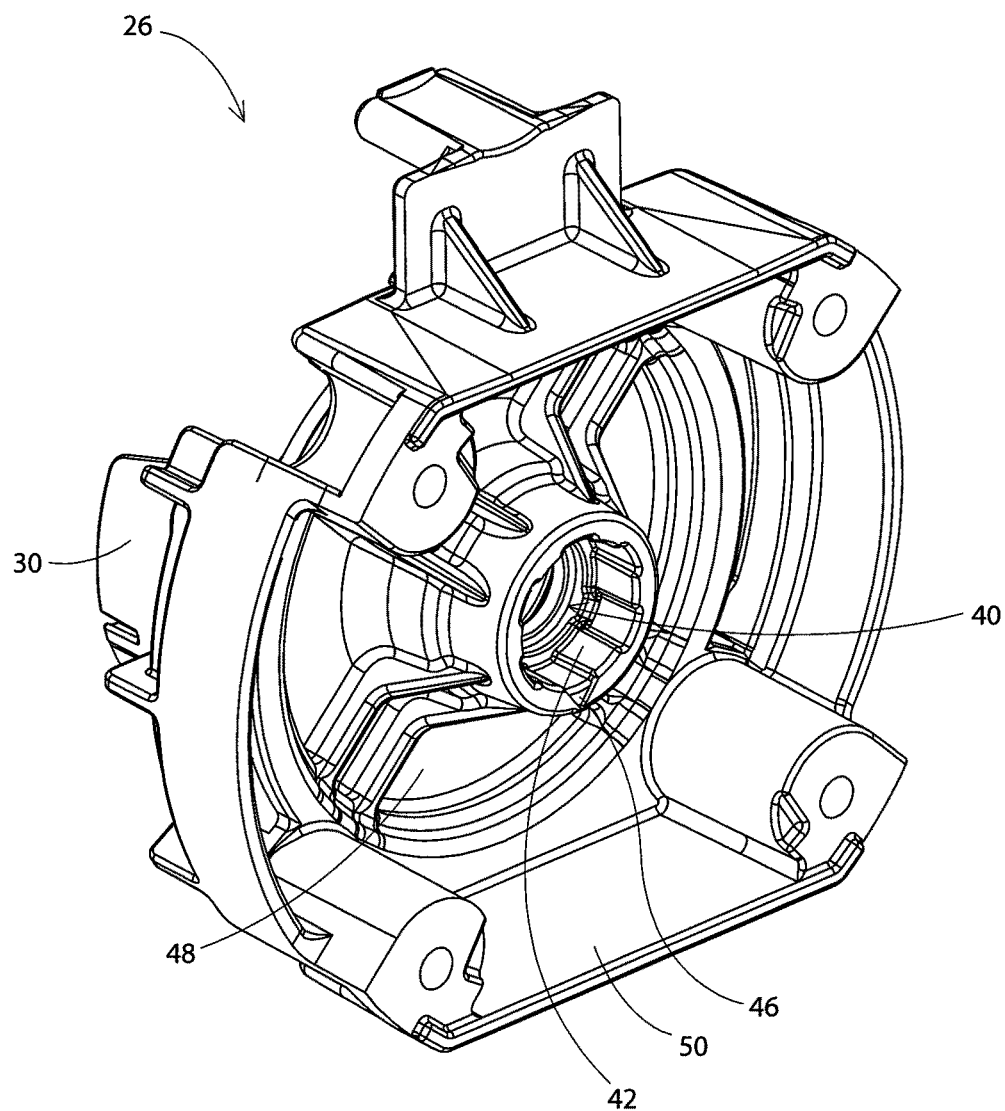
FIG. 4 is a perspective view of the endshield of the electric motor, showing the rear, top, and right side of thereof.
Figure 5:
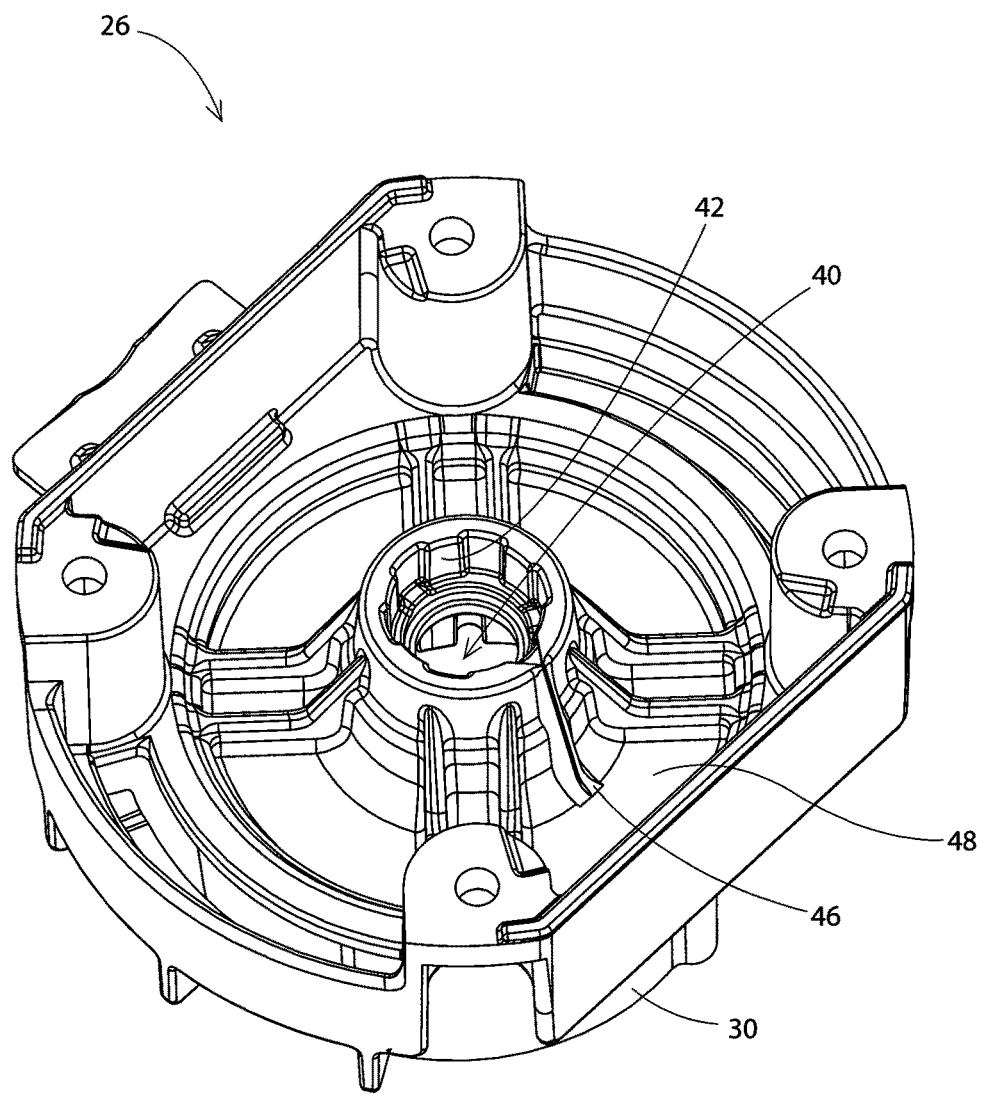
FIG. 5 is a perspective view of the endshield of the electric motor, showing the rear, bottom, and right side of thereof.

Reference numerals in the written specification and in the drawing figures indicate corresponding items.

DETAILED DESCRIPTION

Figure 7:
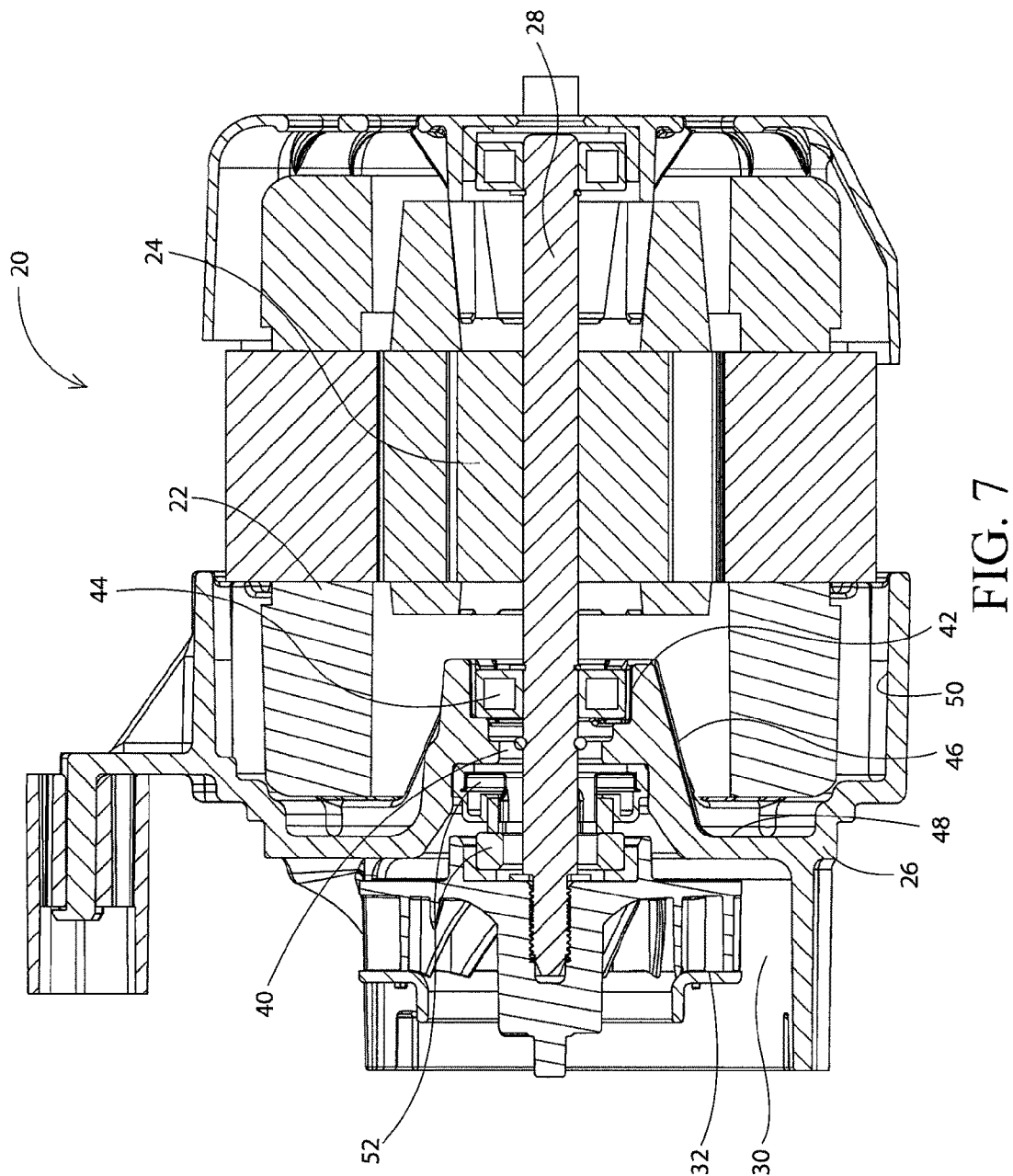
FIG. 7 is a cross-section view of the electric pump showing the left half of the pump as would be viewed from the right.

An embodiment of an electric pump in accordance with the invention is shown in FIGS. 1 and 7. The electric pump 20 comprises a stator 22, a rotor 24 (shown in FIG. 7), and an endshield 26. The stator 22 surrounds most of the rotor 24 and is configured to be fixed in place within an appliance. The rotor 24 is rotationally mounted to the stator 22 and comprises a rotor shaft 28 that extends beyond the stator.

The endshield 26 is rigidly fixed to end of the stator 22. The endshield 26 is preferably moulded out of plastic and therefore is highly resistant to corrosion. The front side of the endshield 26 (the side that faces away from the stator 22) comprises a fluid pump volute 30 which houses an impeller 32 that is operatively connected to one end of the rotor shaft 28 for rotation therewith. A volute housing 34 is attached to the endshield 26 and encircles the volute 30. The volute housing 34 comprises a fluid inlet 36 and a fluid outlet 38. In operation, the impeller 32 rotates with the rotor 24 and draws fluid into the volute 30 via the fluid inlet 36 of the volute housing 34. The fluid drawn in is then forced against the wall of the volute 30 by the impeller 32. The volute 30 then channels the fluid to the fluid outlet 38 of the volute housing 34.

Figure 6:
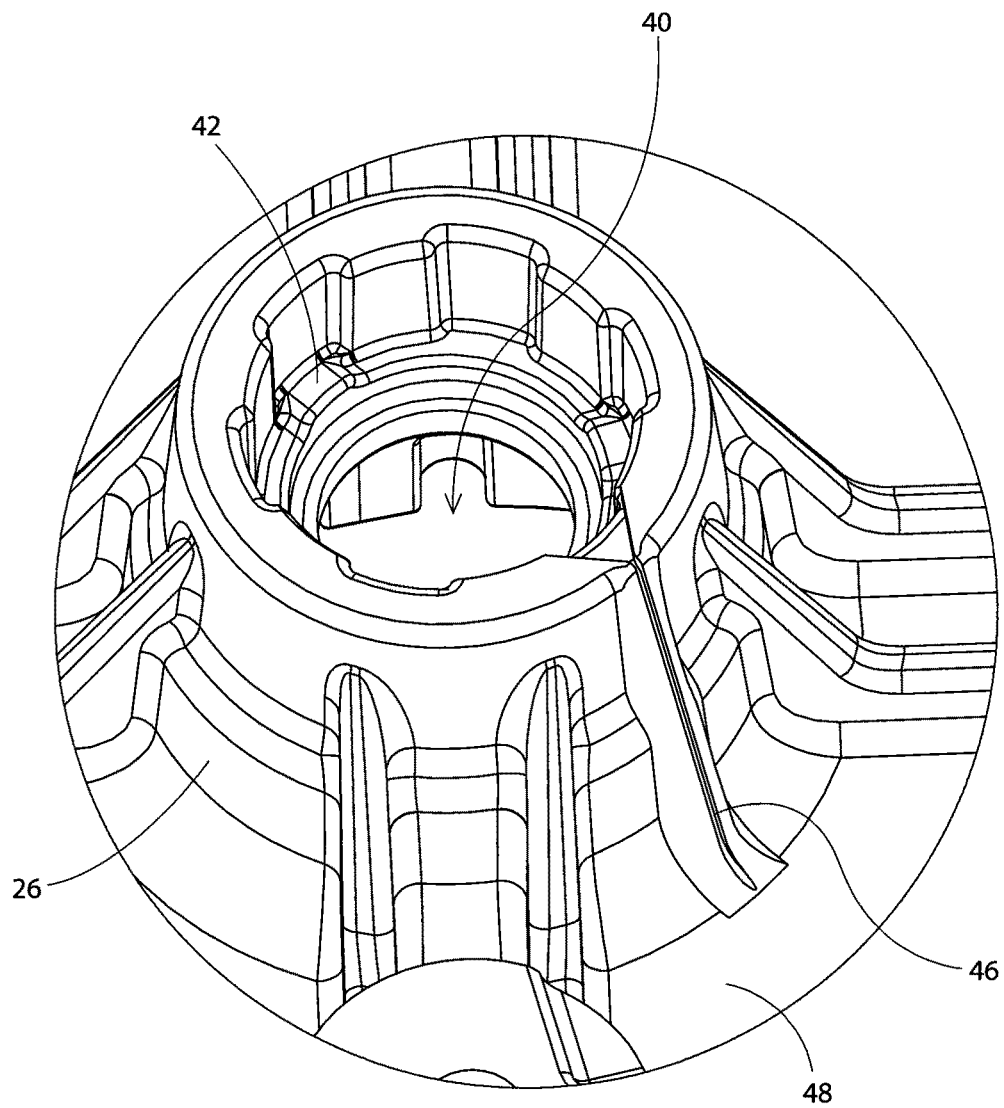
FIG. 6 is a detail perspective view of the endshield as shown in FIG. 5.

The rotor shaft 28 extends through a shaft opening 40 formed through the endshield 26. The shaft opening 40 comprises a pocket 42 that is configured to receive a bearing 44 (shown in FIG. 7). The pocket 42 has undulations that are configured to properly position the bearing 44, regardless of the wear of the molds used to form the endshield 26. These undulations also prevent fluid from backing up against the front of the bearing 44 by providing a path for fluid to pass through the shaft opening 40 around the bearing. As is most clearly shown in FIG. 6, a drainage groove 46 is molded into the rear face of the endshield 26 and extends downward from the end of the shaft opening 40. As the drainage groove 46 extends downward, it also extends toward the front of the electric pump 20. This allows the pocket 42 of the endshield and the bearing 44 to be positioned within the stator 22 in a manner that minimizes the axial length of the electric pump 20. The drainage groove 46 is relatively narrow such that the cohesion tension of the fluid being channeled prevents the fluid from dripping straight downward. The drainage groove 46 terminates at the vertical wall portion 48 of the endshield 26. From there, fluid is able to travel down against the vertical wall 48 until is reaches a generally horizontal surface 48 that is positioned beneath the front end of the stator 22. The horizontal surface 48 serves as a reservoir for any fluid discharged from the drainage groove 46 by provided a place for such fluid to pool.

In use, any fluid that manages to leak past the seals 52 of the electric pump 20 and migrate toward the stator 22 is able to pass through the shaft opening 40 of the endshield 26 and may ultimately reach the drainage groove 46 before evaporating. If it does, the drainage groove 46 will channel the fluid down to the generally horizontal surface 50 of the endshield 26 that lies beneath the front end of the stator 22. Any fluid that collects on the horizontal surface 50 is exposed to the heat of the stator 22, which facilitates the evaporation of the fluid. If the amount of fluid leakage is too excessive for the horizontal surface 50 to hold, the excess is able to flow over the rear edge of the surface and drain out of the electric pump 20. At no point does the fluid make contact with the stator 22 itself.

Figure 8:
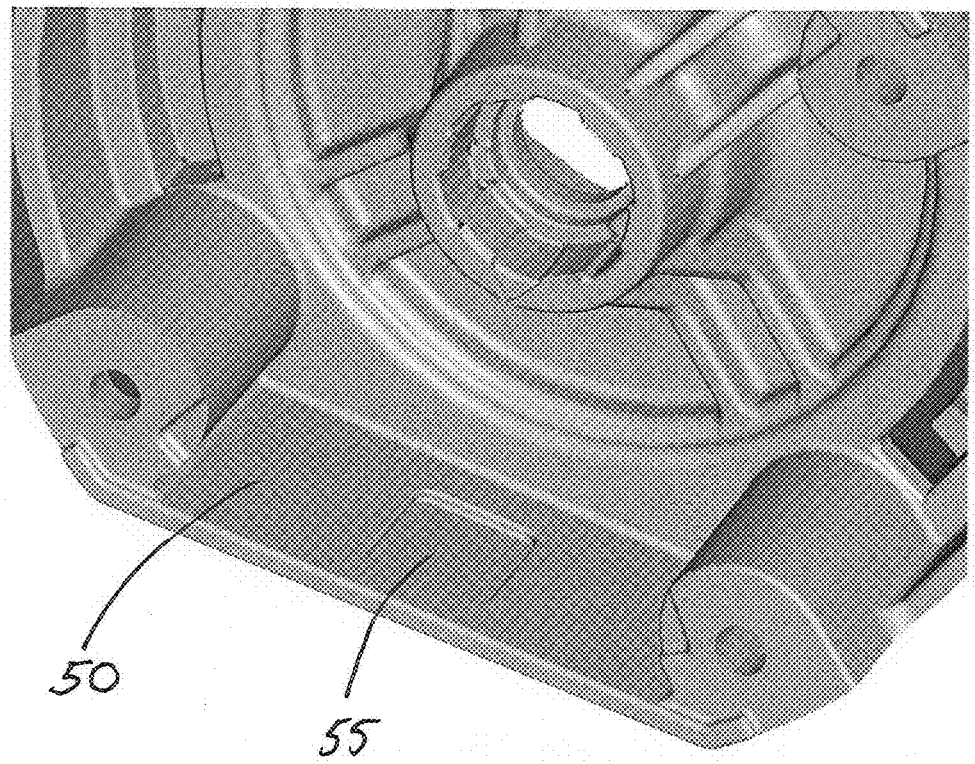
FIG. 8 is a perspective view of the endshield of the electric motor, showing the rear, top, and left side thereof.

In one or more alternative embodiments, the configuration of the horizontal surface 50 may be altered, modified, or additions made thereto so that fluid leakage tends collect thereon rather than flow over the rear edge of the surface and drain out of the electric pump 20. For example, as depicted in FIG. 8, a recess 55 may be formed in the horizontal surface 50. Although recess 55 is depicted as being rectangular, such a recess may be of essentially any appropriately sized configuration or shape. Alternatively, the generally horizontal surface 50 may be formed to have an incline to collect fluid leakage by, for example, skewing the parting plane of a mold from being perpendicular to the rotor axis. Still further, a barrier to the movement of fluid leakage may be placed onto the generally horizontal surface 50 at or near the rear edge (e.g., a strip of foam or a bead of caulk).

By incorporating the fluid pump volute 30 as an integral portion of the endshield 26, the overall length of the electric pump 20 is significantly reduced compared to equally powerful prior art pumps. This allows the electric pump 20 to be incorporated into compact appliances.

In view of the foregoing, it should be appreciated that the invention achieves the several advantages over prior art electric pumps.

As various modifications could be made in the constructions and methods herein described and illustrated without departing from the scope of the invention, it is intended that all matter contained in the foregoing description or shown in the accompanying drawings shall be interpreted as illustrative rather than limiting. For example, while the drainage passageway of the embodiment described above as being an exposed channel or groove, the drainage passageway could alternatively be cylindrical drill hole passageway. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. An improved electric pump comprising a stator, a rotor, an endshield, and a bearing, the rotor having a rotor shaft, the endshield being fixed to the stator and comprising a shaft opening, the shaft opening extending through the endshield, the rotor shaft extending through the shaft opening, the bearing being supported by the endshield, the bearing at least partially supporting the rotor shaft in a manner allowing the rotor shaft to revolve relative to the endshield, the improvement comprising:
 a spiral formation, the spiral formation constituting at least a portion of a fluid pump volute, the spiral formation and the endshield being monolithically formed together as a single part;
 a drainage passageway formed in the endshield, the drainage passageway extending downward from the shaft opening and being configured and adapted to channel liquid downward from the shaft opening via gravity; and
 a fluid reservoir formed by the endshield, the drainage passageway operatively connecting the shaft opening to the fluid reservoir, the fluid reservoir being exposed to and spaced from a surface of the stator.

2. An electric pump in accordance with claim 1 wherein the fluid reservoir comprises a recess in a generally horizontal surface of the endshield that is beneath the stator.

3. An electric pump comprising:
 a stator, the stator having a surface;
 a rotor, the rotor having a rotor shaft;
 an endshield, the endshield being fixed to the stator and comprising a shaft opening and a spiral formation, the shaft opening extending through the endshield, the rotor shaft extending through the shaft opening, the spiral formation constituting at least a portion of a fluid pump volute, the spiral formation and the endshield being monolithically formed together as a single part, the endshield also comprising a drainage passageway and a fluid reservoir, the drainage passageway operatively connecting the shaft opening to the fluid reservoir, the fluid reservoir being exposed to and spaced from the surface of the stator, the drainage passageway extends downward from the shaft opening and is configured and adapted to channel liquid downward from the shaft opening via gravity;
 a bearing, the bearing being supported by the endshield, the bearing at least partially supporting the rotor shaft in a manner allowing the rotor shaft to revolve relative to the endshield.

4. An electric pump in accordance with claim 3 wherein the fluid reservoir comprises a recess in a generally horizontal surface of the endshield that is beneath the stator.

5. An electric pump comprising
 a stator;
 a rotor, the rotor having a rotor shaft;
 an endshield, the endshield being fixed to the stator and comprising a shaft opening, a spiral formation, and a drainage groove, the shaft opening extending through the endshield, the spiral formation constituting at least a portion of a fluid pump volute, the rotor shaft extending through the shaft opening, the drainage groove extending downward from the shaft opening and being configured and adapted to channel liquid downward from the shaft opening via gravity, the drainage groove facing the stator, the spiral formation and the drainage groove being on opposite sides of the endshield, the spiral formation and the endshield being monolithically formed together as a single part, the endshield further comprising a fluid reservoir, the drainage groove operatively connecting the shaft opening to the fluid reservoir, the fluid reservoir being exposed to and spaced from the surface of the stator; and
 a bearing, the bearing being supported by the endshield, the bearing at least partially supporting the rotor shaft in a manner allowing the rotor shaft to revolve relative to the endshield.

6. An electric pump in accordance with claim 5 wherein the fluid reservoir comprises a recess in a generally horizontal surface of the endshield that is beneath the stator.

7. A method of forming an electric motor, the method comprising:
 molding an endshield in a manner such that the endshield comprises a spiral formation, a shaft opening, a drainage passageway, and a fluid reservoir, the shaft opening extending through the endshield, the spiral formation constituting at least a portion of a fluid pump volute, the spiral formation and the endshield being monolithically formed together as a single part, the drainage passageway extends downward from the shaft opening and being configured and adapted to channel liquid downward from the shaft opening via gravity, the drainage passageway operatively connecting the shaft opening to the fluid reservoir;
 attaching the endshield to a stator having a surface in a manner such that the spiral formation faces away from the stator and the fluid reservoir is exposed to and spaced from the surface of the stator;
 positioning a bearing in the shaft opening of the endshield;
 positioning a rotor shaft in manner such that the rotor shaft extends through the bearing and through the shaft opening of the endshield.

* * * * *